(No Model.)
W. B. MASON.
GOVERNOR VALVE.
No. 383,427. Patented May 22, 1888.
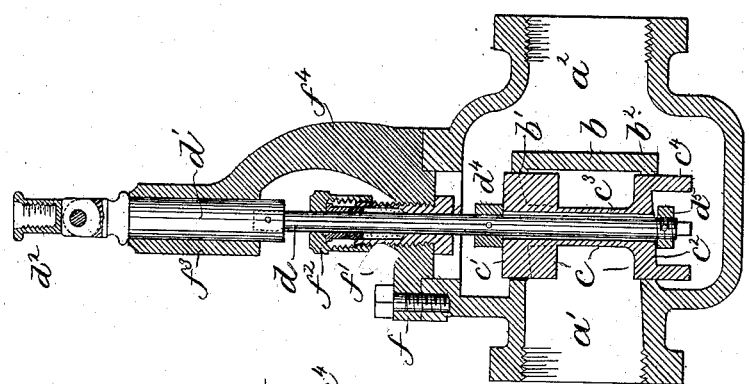
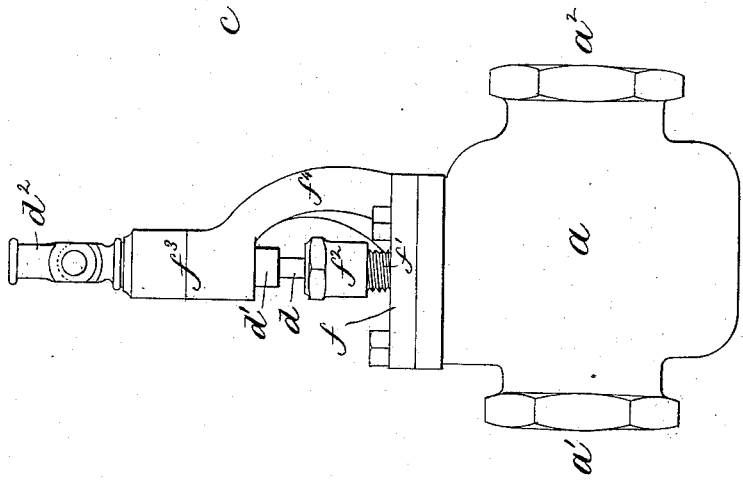
Witnesses,
H. Livermore
H. P. Bates.
Inventor,
William B. Mason,
by Jos. P. Livermore,
Att'y.

UNITED STATES PATENT OFFICE.

WILLIAM B. MASON, OF BOSTON, MASSACHUSETTS, ASSIGNOR TO THE MASON REGULATOR COMPANY, OF SAME PLACE.

GOVERNOR-VALVE.

SPECIFICATION forming part of Letters Patent No. 383,427, dated May 22, 1888.

Application filed August 23, 1886. Serial No. 211,613. (No model.)

*To all whom it may concern:*

Be it known that I, WILLIAM B. MASON, of Boston, county of Suffolk, Massachusetts, have invented an Improvement in Governor-Valves, of which the following description, in connection with the accompanying drawings, is a specification, like letters on the drawings representing like parts.

My invention is embodied in a valve which may be used to control the flow of steam to an engine, or as a governor-valve, its construction being such that it is delicately balanced and requires but little power to move it, and its movement produces a gradual change in the flow of steam or other fluid controlled by it.

The invention consists, mainly, in details of construction of the valve shell or case and valve proper therein, and the valve-stem and means for supporting and guiding the same.

Figure 1 is a side elevation of a valve embodying this invention. Fig. 2 is longitudinal section thereof through the axis of the valve-stem, which is shown in elevation; and Fig. 3 is a side elevation of the valve proper detached.

The shell or case $a$ has an inlet, $a'$, opening into an internal chamber, $b$, having openings $b'$ $b^2$ into the main outlet-chamber communicating with the outlet-opening $a^2$. The valve proper, $c$, (best shown in Fig. 3,) consists of two pistons, $c'$ $c^2$, having a working fit in the openings $b'$ $b^2$, and being connected together by a tubular portion, $c^3$, so that they move together, and the pressure of the fluid entering the inlet-chamber $b$ is equal and opposite on the said pistons, making the valve perfectly balanced.

Both pistons are provided with guide projections $c^4$, which fit in the openings $b'$ $b^2$, and guide the valve after the main portion of the piston is moved out of the said opening in opening the valve to permit the fluid to go through.

The under surfaces of the pistons $c'$ $c^2$ are inclined to their axis or line of movement, so that a portion of the edge of the piston presses out from the openings $b'$ $b^2$ before the remainder, thus making the admission of fluid more gradual and capable of more delicate control than if the passage were opened entirely around the piston at once.

The valve proper, $c$, is actuated by a valve-stem, $d$, passing through an opening in the bonnet $f$ of the valve-casing, the said rod being packed by a stuffing-box that is formed in a hollow bolt, $f'$, screwed tightly into the bonnet from below, and receiving upon its projecting threaded end the other member, $f^2$, of the stuffing-box, by which packing may be compressed upon the stem in the usual manner.

The upper portion of the stem $d$ is connected with a guide portion, $d'$, of larger diameter, fitted in a guide, $f^3$, made in a bracket or arm, $f^4$, (shown as made integral with the bonnet $f$,) and the guide portion $d'$ has connected with it by a hinge-joint a coupling-piece, $d^2$, having a threaded socket, as shown in Fig. 2, so that it can readily be connected with any suitable governing device. The stem $d$ passes loosely through the tubular connecting portion $c^3$ of the valve, and is provided with projections $d^4$ $d^5$, that engage the valve above and below and cause it to move longitudinally with the valve-stem, although permitting a slight independent lateral movement, so that the valve and stem will not bind if they are not exactly in line with one another, each being independently guided, the valve by its projections $c^4$ in the ports or openings $b'$ $b^2$, and the valve-stem being guided in the guide $f^3$ of the bracket and the stuffing-box connected with the bonnet.

I claim—

1. The combination of the valve-shell provided with an inlet-chamber having opposite openings communicating with the outlet-chamber, and the valve consisting of two pistons having a working fit in the said openings, and a connecting portion between the said pistons, the faces of said pistons being inclined to their line of movement, as set forth, whereby a portion of the said pistons passes into or out from the openings controlled by them in advance of the remainder, substantially as and for the purpose described.

2. The combination of the valve-shell provided with an internal chamber having openings, and the bonnet provided with a bracket having a guide-passage, with a piston-valve having a working fit in the said openings in the valve-chamber, and a valve-stem loosely connected with the said valve and passing through the said bonnet and working in the guide-passage in the said bracket, substantially as described.

3. The combination of the valve-shell and valve with a valve-stem and coupling-piece provided with a longitudinal socket connected therewith by a hinge-joint transverse to the axis of the valve-stem, substantially as described.

In testimony whereof I have signed my name to this specification in the presence of two subscribing witnesses.

WM. B. MASON.

Witnesses:
   JOS. P. LIVERMORE,
   H. P. BATES.